(12) United States Patent  
Müller et al.

(10) Patent No.: US 7,675,190 B1  
(45) Date of Patent: Mar. 9, 2010

(54) ASSEMBLY FOR TRANSMITTING INFORMATION VIA A LOW-VOLTAGE POWER SUPPLY NETWORK

(75) Inventors: Kurt Müller, Uster (CH); Hanspeter Widmer, Mellingen (CH)

(73) Assignee: Current Communications International Holding GmbH (CH)

( * ) Notice: Subject to any disclaimer, the term of this patent is extended or adjusted under 35 U.S.C. 154(b) by 0 days.

(21) Appl. No.: 10/149,003

(22) PCT Filed: Dec. 8, 1999

(86) PCT No.: PCT/CH99/00592

§ 371 (c)(1),
(2), (4) Date: Jun. 6, 2002

(87) PCT Pub. No.: WO01/43238

PCT Pub. Date: Jun. 14, 2001

(51) Int. Cl.
*H02J 3/02* (2006.01)
(52) U.S. Cl. ......................................................... 307/3
(58) Field of Classification Search ............ 340/310.11, 340/310.12, 310.13, 310.14, 310.15, 310.16, 340/310.17, 310.18, 310.08; 307/1, 3; 379/413.04; 375/257; 361/93.1, 117, 111
See application file for complete search history.

(56) References Cited

U.S. PATENT DOCUMENTS

| 3,964,048 A | 6/1976 | Lusk et al. |
| 4,004,257 A | 1/1977 | Geissler |
| 4,683,450 A | 7/1987 | Max et al. |

(Continued)

FOREIGN PATENT DOCUMENTS

EP  0 141 673 A2  5/1985

(Continued)

OTHER PUBLICATIONS

"Signalling on Low-Voltage Electrical Installations in the Frequency Band 3kHz to 148.5kHz-Part 4: Filters at the Interface of the Indoor and Outdoor Electricity Network", CLC SC 105A (Secretariat), (May 1992),1-11.

(Continued)

*Primary Examiner*—Albert W Paladini
*Assistant Examiner*—Daniel Cavallari
(74) *Attorney, Agent, or Firm*—Mel Barnes; Capital Legal Group, LLC

(57) ABSTRACT

A coupling apparatus for facilitating communications of data signals over a low voltage electric power network is provided. In one embodiment, the apparatus includes a mains terminal configured to be connected to a low voltage electric power network carrying alternating current (AC) power and an appliance terminal configured to receive a male electric plug. The two terminals may be housed in a housing and connected via one or more inductive elements that attenuate high frequencies while allowing the AC power to pass through substantially unimpeded. Thus, interference caused by an appliance connected to the appliance terminal is filtered to prevent such interference from being conducted onto the low voltage electric power network. The apparatus also may include a third terminal that in some embodiments is electrically connected to the mains terminal to thereby output the data signals and AC power. In other embodiments, a modem may connect the third terminal to the mains terminal in which case the third terminal may communicate demodulated data to a communication device without outputting the AC power.

18 Claims, 4 Drawing Sheets

U.S. PATENT DOCUMENTS

| | | | |
|---|---|---|---|
| 4,703,306 A * | 10/1987 | Barritt | 340/310.18 |
| 4,766,414 A | 8/1988 | Shuey | |
| 4,772,870 A | 9/1988 | Reyes | |
| 4,903,006 A | 2/1990 | Boomgaard | |
| 5,066,939 A | 11/1991 | Mansfiled, Jr. | |
| 5,115,368 A * | 5/1992 | Smith | 361/56 |
| 5,355,109 A | 10/1994 | Yamazaki | |
| 5,537,087 A | 7/1996 | Naito | |
| 5,684,450 A | 11/1997 | Brown | |
| 5,777,769 A | 7/1998 | Coutinho | |
| 5,870,016 A | 2/1999 | Shresthe | |
| 5,952,914 A | 9/1999 | Wynn | |
| 6,140,911 A * | 10/2000 | Fisher et al. | 375/258 |
| 6,144,292 A | 11/2000 | Brown | |
| 6,172,597 B1 | 1/2001 | Brown | |
| 6,177,849 B1 | 1/2001 | Barsellotti et al. | |
| 6,282,405 B1 | 8/2001 | Brown | |
| 6,297,729 B1 | 10/2001 | Abali et al. | |
| 6,335,672 B1 | 1/2002 | Tumlin et al. | |
| 6,480,510 B1 * | 11/2002 | Binder | 370/502 |
| 6,771,775 B1 | 8/2004 | Widmer | |
| 6,785,532 B1 | 8/2004 | Rickard | |
| 2002/0075097 A1 * | 6/2002 | Brown et al. | 333/185 |
| 2005/0128057 A1 | 6/2005 | Mansfield et al. | |

FOREIGN PATENT DOCUMENTS

| | | |
|---|---|---|
| WO | 95/29537 A1 | 11/1995 |
| WO | WO-98/33258 A2 | 7/1998 |

OTHER PUBLICATIONS

SADO, W N., et al., "Personal Communication on Residential Power Lines—Assessment of Channel Parameters", IEEE (Nov 1995),532-537.

* cited by examiner

ASSEMBLY FOR TRANSMITTING INFORMATION VIA A LOW-VOLTAGE POWER SUPPLY NETWORK

This application is the national phase under 35 U.S.C. §371 of PCT International Application No. PCT/CH99/00592 which has an International filing date of Dec. 8, 1999, which designated the United States of America.

TECHNICAL FIELD

The invention relates to an arrangement for transmitting messages via a low-voltage power supply system, comprising a first and a second data terminal, and a coupling apparatus.

PRIOR ART

Electronic communications, that is to say the transmission of data in electronic form, is becoming increasingly important. This relates not only to supplying a bank specialist with the latest stock market data directly to his work station, but also to switching on the heating at home by remote control while travelling back from a winter holiday. The appropriate data are normally generated and processed in data terminals such as computers, which are connected to the power supply system to supply them with electrical power.

One possible transportation route for such data is the power supply system itself. It is known for messages such as telephone calls, fax copies and digital data etc. to be transmitted via low-voltage power supply systems. To do this, the messages are coded and are modulated onto a radio-frequency carrier signal in a known manner, for example by frequency modulation. The modulated carrier signal is injected by the respective transmitter into the low-voltage power supply system, and is output and decoded once again in the same way by the respective receiver. Message transmission systems which use a power supply system in this way are described, for example, in WO-A-95/29 537.

Couplers, which for their part are connected to the low-voltage power supply system, are used for injecting and outputting messages and the modulated carrier signal into and out of the low-voltage power supply system.

Various processes can result in radio-frequency interference occurring in low-voltage power supply systems, which interference is superimposed on the carrier signal and is also output with it and, in some circumstances, has a disadvantageous influence on the quality of the message transmission. In consequence, it is necessary to repeat transmissions, and this results in a reduction in the data rate. Suppression of such interference at the receiver is often feasible only with a considerable amount of circuitry complexity, or is entirely impossible. In this case, the strongest inference signals often originate from the region close to the appliances involved in the message interchange, such as a computer intended for processing the received messages, or from reflections on open cable terminations.

Such arrangements for data transmission via power supply systems thus have various disadvantages. Firstly, interference signals pass without being filtered into the power supply system and are superimposed on the modulated carrier signals, and secondly an additional mains connection for the coupling apparatus is required in each data terminal in addition to the appliance mains connection, and wherever data are intended to be injected into or output from the power supply system.

DESCRIPTION OF THE INVENTION

The object of the invention is to specify an arrangement of the type mentioned initially, which avoids the problems that occur with the prior art and whose suitability for transmitting messages is considerably improved, and to specify a coupling apparatus which is suitable for use in the arrangement according to the invention.

The solution of the object is defined by the features in claim 1. According to the invention, the arrangement for transmitting messages via a low-voltage power supply system comprises a first and a second data terminal between which the messages are transmitted, with the first data terminal being connected to the low-voltage power supply system via at least one coupling apparatus. For this purpose, apart from a mains connection for connection of the coupling apparatus to the low-voltage power supply system and an appliance connection for connection of an appliance to be supplied with electrical power to the coupling apparatus, each coupling apparatus has a combined data/mains connection. The messages superimposed on the supply signal are transmitted at the same time as the supply signal, via this data/mains connection.

As a result of a coupling apparatus being connected between the low-voltage power supply system and the appliances such as the first data terminal which are to be connected to it, each coupling apparatus has mains access for injecting and outputting the messages into and out of the low-voltage power supply system, and no additional female mains connectors are required for connection of the appropriate couplers.

The first data terminal preferably has a message connection and a mains connection. The mains connection is designed in such a way that the data terminal can be connected to the low-voltage power supply system by this connection in order to supply it with electrical power. However, the data terminal is not connected directly to the low-voltage power supply network, but is connected via its mains connection to the appliance connection of a first coupling apparatus. For its part, this first coupling apparatus is connected via its mains connection to the low-voltage power supply system.

The message connection of the data terminal allows messages generated by the data terminal to be transmitted and/or messages intended for this data terminal to be received. The data terminal is connected by its message connection and via a data link to the data/mains connection of the first or of a second coupling apparatus. The second coupling apparatus, which may be present, is also connected via its mains connection to the low-voltage power supply system.

In one preferred embodiment of the arrangement according to the invention, the first data terminal is connected via its mains connection and via the data link to the same coupling apparatus, namely the first coupling apparatus: the mains connection of the data terminal is connected to the appliance connection, and the message connection is connected via the data link to the data/mains connection.

In order to change messages to be transmitted into a form which is suitable for transmission via the low-voltage power supply system, a transmitting/receiving apparatus is preferably provided in the data link. This transmitting/receiving apparatus has a message connection and data/mains connection. The message connection of the transmitting/receiving apparatus is suitable for transmitting and receiving the messages, and is connected to the message connection of the first data terminal. The data/mains connection of the transmitting/receiving apparatus is connected to the data/mains connection of the first or, if appropriate, of the second coupling apparatus, with the transmitting/receiving apparatus firstly being supplied with the high-power supply signal via its data/mains connection, and secondly also having the capability to transmit or receive a radio-frequency transmission signal superimposed on this supply signal.

Furthermore, the transmitting/receiving apparatus has means for generating the transmission signal from the received messages, and means for generating the messages from the received transmission signal.

The transmission signal is formed in the transmitting/receiving apparatus, for example, by modulating the messages, that is to say the low-frequency message signals, onto a radio-frequency carrier signal. The carrier frequency, that is to say the frequency of the carrier signal, is in this case considerably higher than the mains frequency of the low-voltage power transmission system. The generation, processing and conditioning of the message signal are typically carried out using the data terminal, although, of course, the transmission and reception can also precede or follow coding or further processing steps.

The arrangement according to the invention is preferably located inside a building or a building complex.

The coupling apparatus, as it can be used in particular in arrangements of the type just described, will be described in more detail in the following text. It is of compact construction, has a low weight, and can thus easily be integrated in other appliances, and can be fitted and removed again without any problems and quickly, thus offering a simple and cost-effective possible way of implementing the invention.

Apart from a mains connection for connection to the low-voltage power supply system and an appliance connection for connecting an appliance to be supplied with electrical power to the coupling apparatus, a coupling apparatus according to the invention has a combined data/mains connection. Firstly, in order to supply it with power, a further appliance can be connected to the data/mains connection and, secondly, radio-frequency message signals can be transmitted from or to this appliance into or out of the low-voltage power supply system via the data/mains connection, by superimposing these message signals on the low-frequency supply signal.

The mains connection of the coupling apparatus comprises at least two mains contacts. These are used for connecting the coupling apparatus to a low-voltage power supply system having at least two electrical conductors, in which case the term electrical conductor covers not only a neutral conductor but also a phase conductor, but not a protective-earth conductor. The coupling apparatus can thus be connected by its mains connection to a low-voltage power supply system having a neutral conductor and at least one phase conductor.

The appliance connection of the coupling apparatus comprises the same number of appliance contacts as the number of mains contacts in the mains connection, that is to say one for the neutral conductor and at least one for the at least one phase conductor. A mains connection is provided between each mains contact and each appliance contact.

The data/mains connection of the coupling apparatus has at least two data/mains contacts, but at most the same number of data/mains contacts as the number of mains contacts in the mains connection. A data/mains link is provided between each data/mains contact and each mains contact.

The coupling apparatus preferably has two, and only two, mains contacts, and thus two, and only two, appliance contacts as well.

As already mentioned, most appliances which are connected to the low-voltage power supply system produce radio-frequency interference signals, which are superimposed on a radio-frequency transmission signal and can have a negative effect on data transmission. Data terminals are no exception to this. However, in order to prevent the interference signals from the data terminal interfering with the transmission of its own messages, an induction coil is located in each mains link, that is to say between each mains connection and appliance connection. These induction coils filter radio-frequency signal elements out of the signals transmitted via the corresponding conductors, and in this way keep radio-frequency interference away from the power supply system.

However, the induction coils have another major advantage. They prevent parts of the radio-frequency transmission signal from reaching the data terminal via the appliance connection of the coupling apparatus. They thus ensure that, firstly, no radio-frequency signals can enter the data terminal as virtual interference signals via the power supply connection and, secondly, that the transmission signal passes from the low-voltage power supply system to the transmitting/receiving apparatus, and from the transmitting/receiving apparatus to the low-voltage power supply system, with as little power loss as possible.

The coupling apparatus according to the invention is preferably used in low-voltage power supply systems with a system frequency of less than 1 kHz. The frequency of the carrier signal onto which the messages are modulated is between 1 MHz and 60 MHz. In order to suppress the undesirable interference optimally in such conditions, the induction coils in the mains conductor connections preferably each have an inductance of between 1 µH and 20 µH. The use of induction coils saves space and avoids saturation effects.

In one preferred embodiment of the coupling apparatus, said coupling apparatus is designed for connection to a low-voltage power supply system having a protective-earth conductor, for example an earth conductor. Its mains connection thus has an earth conductor mains contact, and its appliance connection has an earth-conductor appliance contact. The earth-conductor mains contact is connected to the earth-conductor appliance contact by an earth-conductor mains connection.

If, as just described, the coupling apparatus has contacts and connections for an earth conductor then, in a further embodiment of the invention, the data/mains connection of the coupling apparatus is preferably also equipped with a contact for the earth conductor, that is to say an earth-conductor data/mains contact. In this case, the earth-conductor mains contact is connected to the earth-conductor data/mains contact by means of an earth-conductor data/mains connection.

The mains connection of the coupling apparatus is preferably in the form of a male connector, that is to say a male mains connector with pins. It comprises a contact pin for each mains contact, and an additional contact pin for any earth-conductor mains contact which may be present. This male mains connector is designed in such a way, and complies with the appropriate Standards, that it can be inserted into an appropriately designed and standardized female mains connector for the low-voltage power supply system.

In order that the coupling apparatus can be used and handled as easily as possible, its appliance connection is advantageously designed as a female connector with sockets. It comprises a contact socket for each appliance contact, and an additional contact socket for any earth-conductor appliance contact which may be present. This female connector is designed in such a way and satisfies the appropriate Standards that an appropriately designed or standardized male mains appliance connector of an appliance to be supplied with electrical power can be inserted into it.

This ensures that any required appliances which can be connected directly to the low-voltage power supply system by means of an appropriate male mains appliance connector can also be connected to it indirectly via a coupling apparatus. The male mains appliance connector of the appliance is simply pulled out of the female mains connector and is inserted into the female connector of the appliance connection of the coupling apparatus. After this, the mains connection, which is in the form of a male mains connector, of the coupling apparatus is simply inserted into this female mains connector.

In one particularly preferred embodiment of the invention, the mains connection and the appliance connection are accommodated in a common housing, and the data/mains connection is located at the end of a data/mains cable which is routed out of this housing. The wires of this data/mains cable are connected, in the housing, to the appropriate contacts of the mains connection and form the data/mains links as well as the earth-conductor data/mains connection if the data/mains connection also has an earth-conductor data/mains contact. The data/mains connection may be either in the form of a male connector or in the form of a female connector, or is connected directly to the appropriate connections of the appliance connected thereto. In the process, it must be remembered that although it is technically feasible to design the data/mains connection as a male connector, this, however, is not a good idea in terms of safety and, depending on the legal regulations, it may even be illegal to design electrical connections as contact pins of a male connector if they may be live while the connector is not mated.

The mains connection and the appliance connection are, for example, arranged in a line to ensure that, firstly, when the coupling apparatus is being inserted into a female mains connector and, secondly, when a male mains appliance connector is being inserted into the female connector of the appliance connection, the transverse forces which act, that is to say those forces which act transversely with respect to the insertion direction of the coupling apparatus into the low-voltage power supply system, are as low as possible. The two straight lines which are formed by the continuation of a contact pin or of the corresponding contact socket are in consequence not only parallel, but are even located one above the other, that is to say they are virtually identical.

The data/mains cable of the data/mains connection in this arrangement of the mains and appliance connection is, for example, routed out of the housing at the side.

In a further preferred embodiment of the invention, the data/mains connection is likewise in the form of a female connector with sockets. It comprises a contact socket for each data/mains contact, and an additional contact socket for any earth-conductor data/mains contact which may be present. This female connector is designed and complies with the appropriate Standards in such a way that an appropriately designed or standardized male mains appliance connector of an appliance to be supplied with electrical power can be inserted therein.

In order to provide such a coupling apparatus of this type in a compact and convenient form, it is preferably inserted into a dimensionally stable housing. This has suitable openings for the male mains connector of the mains connection, for the female connector of the appliance connection and for the female connector of the data/mains connection. In this case, the openings are arranged and formed in the housing in such a way that the mains connection of the coupling apparatus can be inserted into a female mains connector of the low-voltage power supply system, the male mains appliance connector of an appliance to be supplied with electricity can be inserted into the mains connection of the coupling apparatus and, at the same time, the male mains appliance connector of a further appliance to be supplied with electricity can be inserted into the data/mains connection of the coupling apparatus. There is thus sufficient space between the openings to ensure that the male connectors and female connectors do not interfere with one another.

Further advantageous embodiments and feature combinations of the invention result from the following detailed description and from all of the patent claims.

BRIEF DESCRIPTION OF THE DRAWINGS

In the drawings which are used to explain the exemplary embodiment.

In principle, identical parts in the figures are provided with the same reference symbols.

WAYS TO IMPLEMENT THE INVENTION

Figure 1:
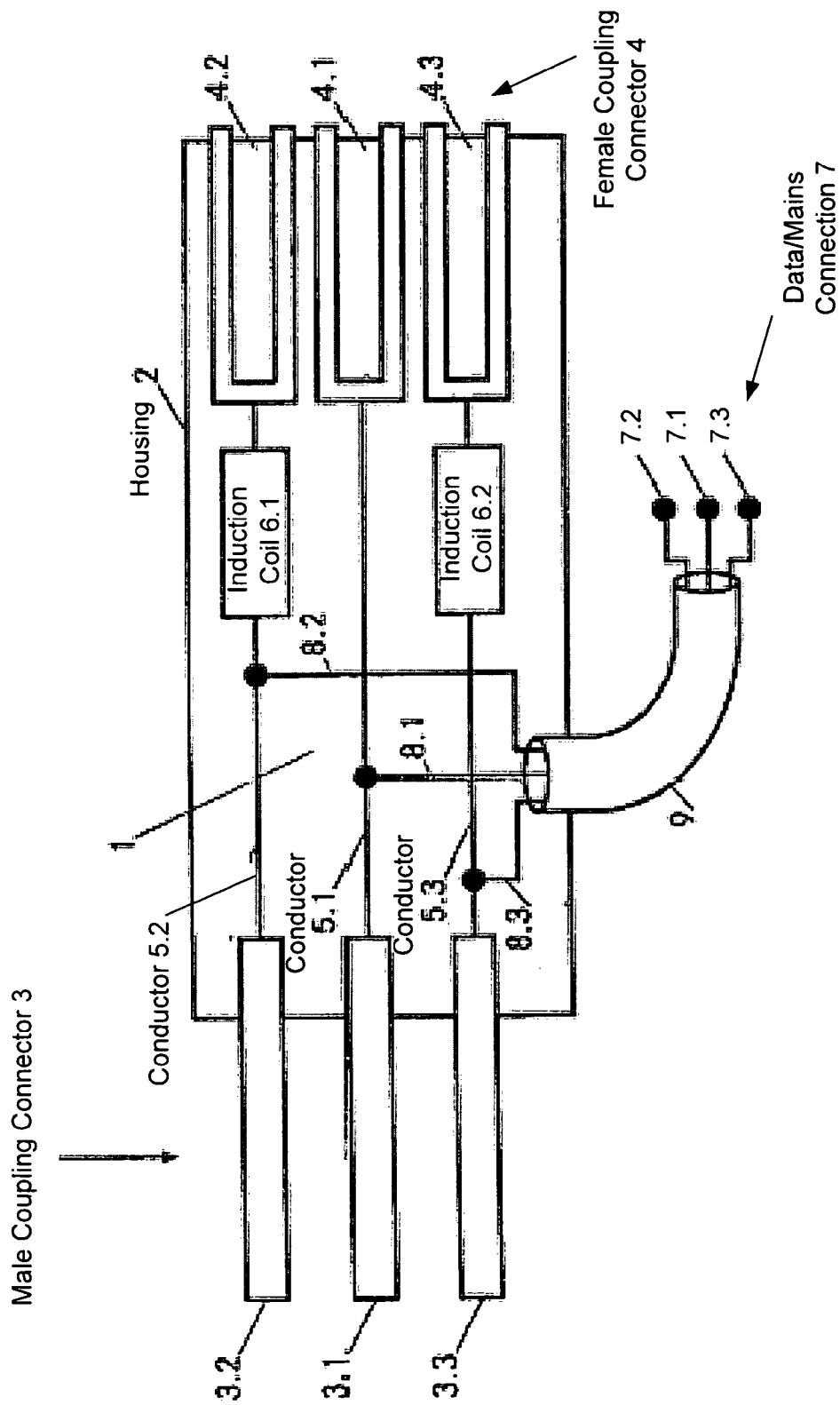
FIG. 1 shows a schematic illustration of the coupling apparatus according to the invention.

FIG. 1 illustrates a coupling apparatus 1 according to the invention, schematically. This has a male mains coupling connector 3 as the network connection at one end, which is designed to be inserted into a female mains connector of the relevant low-voltage power supply system. A female coupling connector 4 is formed, as an appliance connection, at the opposite end of the coupling apparatus 1, is compatible with the male mains coupling connector 3, and thus physically corresponds to a female mains connector. That is to say any desired appliance which has a male mains appliance connector which is designed for connecting the appliance to the relevant power supply system can also be connected to the coupling apparatus 1 by inserting the male mains appliance connector into the female coupling connector 4. The male mains coupling connector 3 and the female coupling connector 4 are accommodated in a common housing 2.

The male mains coupling connector 3 has three contact pins, an earth-conductor contact pin 3.1, a neutral-conductor contact pin 3.2 and a phase-conductor contact pin 3.3. The female coupling connector 4 has an earth-conductor contact socket 4.1, a neutral-conductor contact socket 4.2 and a phase-conductor contact socket 4.3. There is a respective conductor connection 5.1, 5.2 and 5.3, between the earth-conductor contact pin 3.1 and the earth-conductor contact socket 4.1, between the neutral-conductor contact pin 3.2 and the neutral-conductor contact socket 4.2, and between the phase-conductor contact pin 3.3 and the phase-conductor contact socket 4.3. There is an induction coil 6.1 and 6.2, respectively, in each of the two conductor connections 5.2 and 5.3.

The coupling apparatus 1 also has a data/mains connection 7 with an earth-conductor contact connection 7.1, a neutral-conductor contact connection 7.2 and a phase-conductor contact connection 7.3. The data/mains connection is located at the end of a data/mains cable 9 which is routed out of the housing 2. There is a respective conductor connection 8.1, 8.2 and 8.3 between the earth-conductor contact pin 3.1 and the earth-conductor contact connection 7.1, between the neutral-conductor contact pin 3.2 and the neutral-conductor contact connection 7.2, and between the phase-conductor contact pin 3.3 and the phase-conductor contact connection 7.3.

Thanks to the limitation to induction coils—there is no need for any capacitances—it is possible to construct a coupling apparatus not only cheaply but also in very compact form. In particular, it is possible to avoid a long physical length which, owing to the greater lever arm of any forces acting, would severely increase the risk of the intermediate piece breaking off or else of female mains connectors being damaged or torn out.

However, of course, the data/mains connection of the coupling apparatus 1 may also be designed as a female connector with contact sockets or as a male connector with contact pins, in which case, however, the statements which have already been made with regard to safety and the legal regulations must be taken into account.

Figure 2:
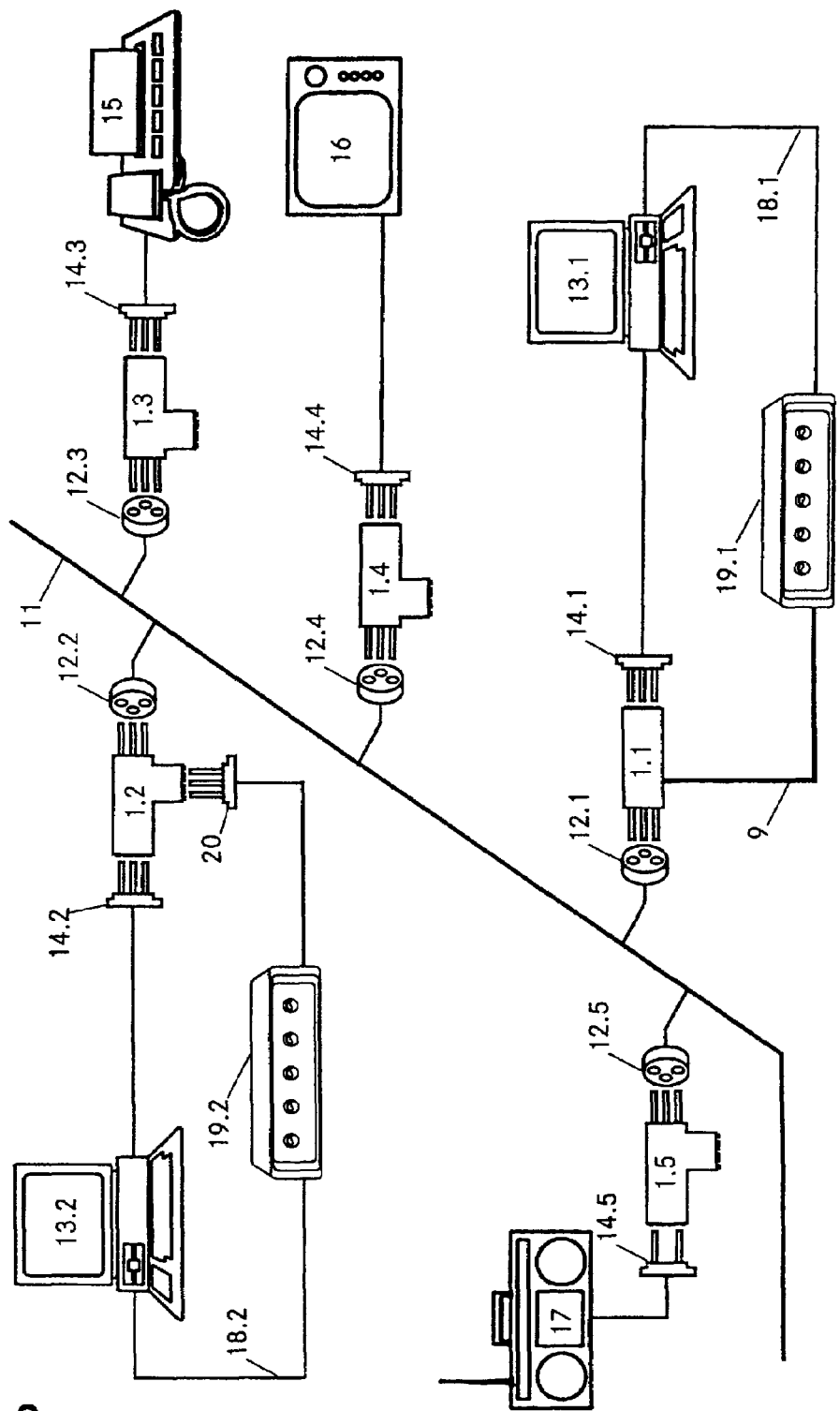
FIG. 2 shows a schematic illustration of an arrangement for transmitting messages, according to the invention.

FIG. 2 shows a schematic arrangement for transmitting messages—these may be telephone calls, fax copies, digital data, any desired audio or video signals or any other messages—via a low-voltage power supply system 11, which is preferably located inside a public or private building, or building complex. The low-voltage power supply system 11 has a number of female mains connectors 12.1 to 12.5. The respective male mains coupling connectors of coupling apparatuses 1.1 to 1.5 are inserted into the female mains connectors 12.1 to 12.5. For the sake of clarity, all the male connectors and associated female connectors are drawn as if the male connector were not inserted in the female connector. (This applies to all the figures.)

The messages are transmitted via the low-voltage power supply system 11 between the two computers 13.1 and 13.2, which are connected to the low-voltage power supply system 11 by inserting their male mains connectors 14.1 and 14.2, respectively, into the female coupling connector of the coupling apparatuses 1.1 and 1.2, respectively. In this case, a carrier frequency is used which is well above the mains frequency and is preferably between 1 MHz and 60 MHz, preferably being at least 10 MHz.

Further electrical loads are connected to the same low-voltage power supply system 11 by inserting the respective male mains connector 14.3, 14.4 or 14.5 into the female coupling connectors of the coupling apparatuses 1.3, 1.4 and 1.5, respectively: a fax machine 15, a television 16 or an audio tape player 17. It should be remembered that the male mains connector 14.5 of the audio tape player 17 has only two poles, that is to say only one neutral conductor and one phase conductor, but does not have any earth conductor. Such appliances can, of course, likewise be connected to the low-voltage power supply system 11 via a coupling apparatus according to the invention.

Interference with high-frequency elements is produced in the loads (irrespective of whether they are switched on or off) or in the cable sections between the loads and the female mains connectors or coupling apparatuses.

In order to allow the messages generated by the computer 13.1 or 13.2 to be transmitted, they are both connected to a respective modem 19.1 or 19.2 via an appropriate signal connection 18.1 or 18.2, respectively. The modems 19.1, 19.2 each in turn have a data/mains connection. In the modem 19.2, this is in the form of a male mains data connector 20. In the modem 19.1, it is in the form of connecting contacts, which are located inside the modem. The coupling apparatus 1.1 is in the form shown in FIG. 1. Its data/mains contacts are located at the end of the data/mains cable 9, and are connected directly to the appropriate connecting contacts of the data/mains connection of the modem 19.1.

The data/mains connection of the coupling apparatuses 1.2 to 1.5 is in the form of a female connector, into which a male mains connector can be inserted which is in the form of a connection to the low-voltage power supply system 11. The male mains data connector 20 is thus in the form of a male mains connector which can be inserted into any desired female mains connector 12.1 to 12.5 of the low-voltage power supply system 11. It is inserted into the data/mains connection of the coupling apparatus 1.2, which is in the form of a female connector. The data/mains connection of the modem 19.1, 19.2 uses this firstly for supplying electrical power, and at the same time for receiving and transmitting the messages transmitted via the low-voltage power supply network 11.

If the radio-frequency interference produced in the loads and in the cables were to reach a modem 19.1 or 19.2 without being significantly attenuated, it could be suppressed there only by measures involving highly complex circuitry, if at all. This would interfere severely with the reception of messages on which such interference was superimposed.

For this reason, the appliances which may be sources of interference signals, in particular those which may be used in the said range between 1 MHz and 60 MHz, which is preferred for message interchange, are each connected to the low-voltage power supply system 11 via a coupling apparatus 1.1 to 1.5 according to the invention. The radio-frequency interference signals which originate from the said appliances are virtually completely suppressed by the induction coils in the coupling apparatuses 1.1 to 1.5, so that they do not interfere with message reception by modems 19.1 or 19.2.

The use of the coupling apparatuses 1.3 to 1.5 according to the invention for connecting further user appliances also makes an additional mains access available for connecting a modem for the purpose of data transmission. For example, the television 16 could be equipped with a further modem for calling Internet pages, and this modem could be connected to the data/mains output of the coupling apparatus 1.4.

Furthermore, the induction coils in the coupling apparatuses 1.1. to 1.5 have the advantage that they keep the modulated, radio-frequency carrier signal away from the downstream computers 13.1 and 13.2. All the signal energy is thus available for transmission via the low-voltage power supply system.

The coupling apparatuses 1.1 to 1.5 also have the effect that the cable between the male mains connector and the respective appliance which, particularly if its length is inappropriate, represents an open line termination and can cause sensitive interference even when the appliance is switched off, can in practice be decoupled for relatively high frequency signals. Reflections are thus suppressed, and the sum total of the interference signals on the low-voltage power supply system 11 is reduced further and, in some cases, very considerably.

The reduction in the interference allows the data transmission rate to be increased considerably. Furthermore, the strength of the carrier signal can be reduced, so that legal limitations on the overall level of radio-frequency signals on the low-voltage power supply system 11 can be complied with considerably more easily.

Various modifications of the coupling apparatus 1 are possible within the context of the invention. Thus, for example, it can be designed as a distribution panel with a number of female coupling connectors and/or a number of data/mains connections.

Figure 3:
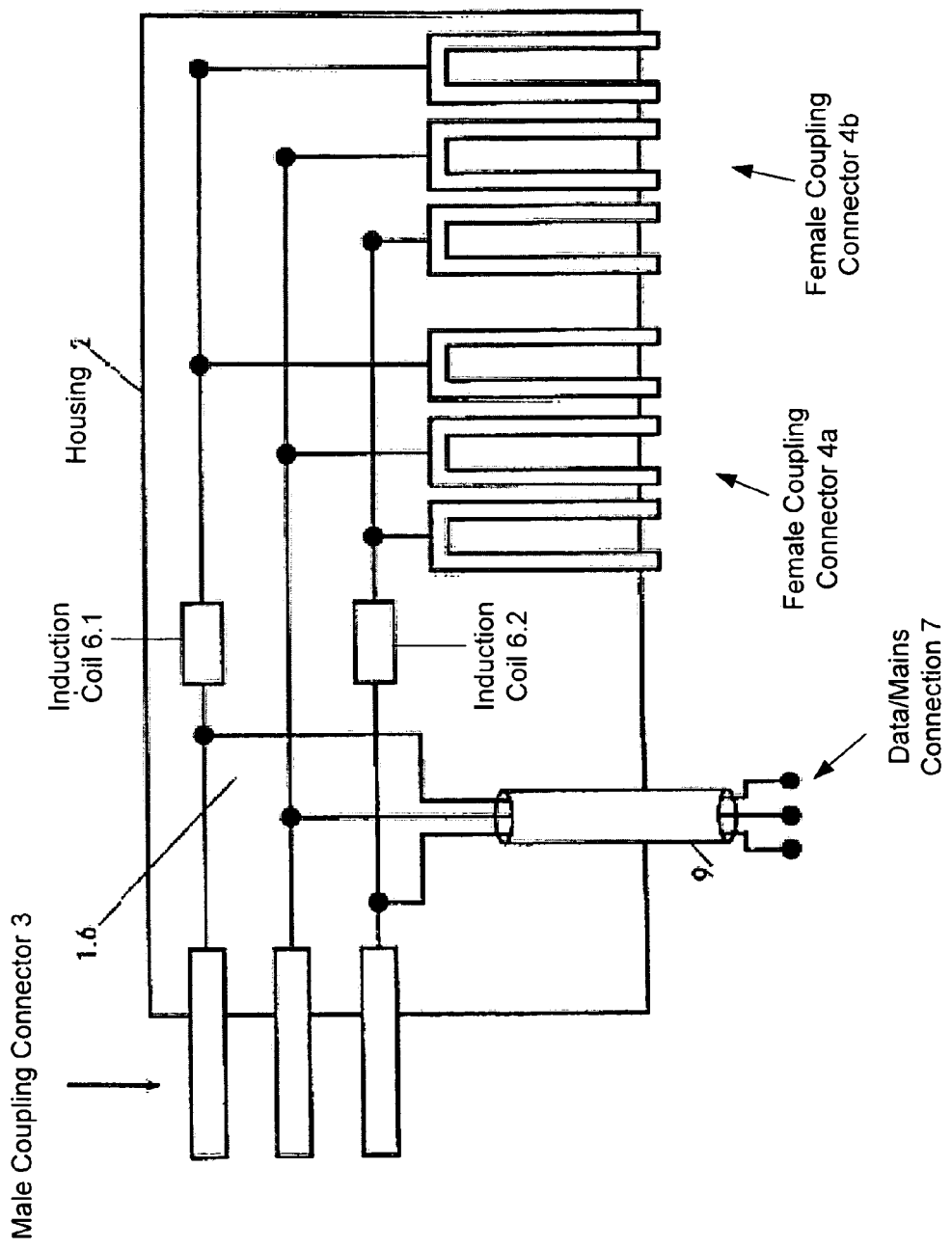
FIG. 3 shows a schematic illustration of a coupling apparatus having two female coupling connectors.

By way of example, FIG. 3 shows a coupling apparatus 1.6 which has a male mains coupling connector 3, a data/mains connection 7 and two female coupling connectors 4*a* and 4*b*.

The male mains coupling connector (3) and the two female coupling connectors 4a and 4b are accommodated in a common housing 2, and the data/mains connection is in turn located at the end of a data/mains cable 9 which is routed out of the housing 2. The contact sockets of the coupling connectors 4a and 4b are connected to the contact pins of the male mains coupling connector 3 in an analogous manner to that in the coupling apparatus shown in FIG. 1. The interference introduced via the two female coupling connectors 4a and 4b is filtered out, jointly for both female coupling connectors 4a and 4b, by the two induction coils 6.1 and 6.2. However, it would also be possible to provide dedicated induction coils for each of the female coupling connectors 4a and 4b which are present.

In a similar way to that for the data/mains connection of coupling apparatus, the mains connections also need not necessarily be in the form of male connectors or female connectors integrated in a housing. It is possible, for example, for one connection to be provided as a male connector or female connector at the end of a corresponding connecting cable, whose wires for their part are connected to the respective contacts of the coupling apparatus, or for a connection not to be in the form of a male connector or female connector at all, but to be firmly connected to the corresponding contacts of the mating element. In this case as well, however, the above statements with regard to technical feasibility and legal regulations must be taken into account.

Figure 4:
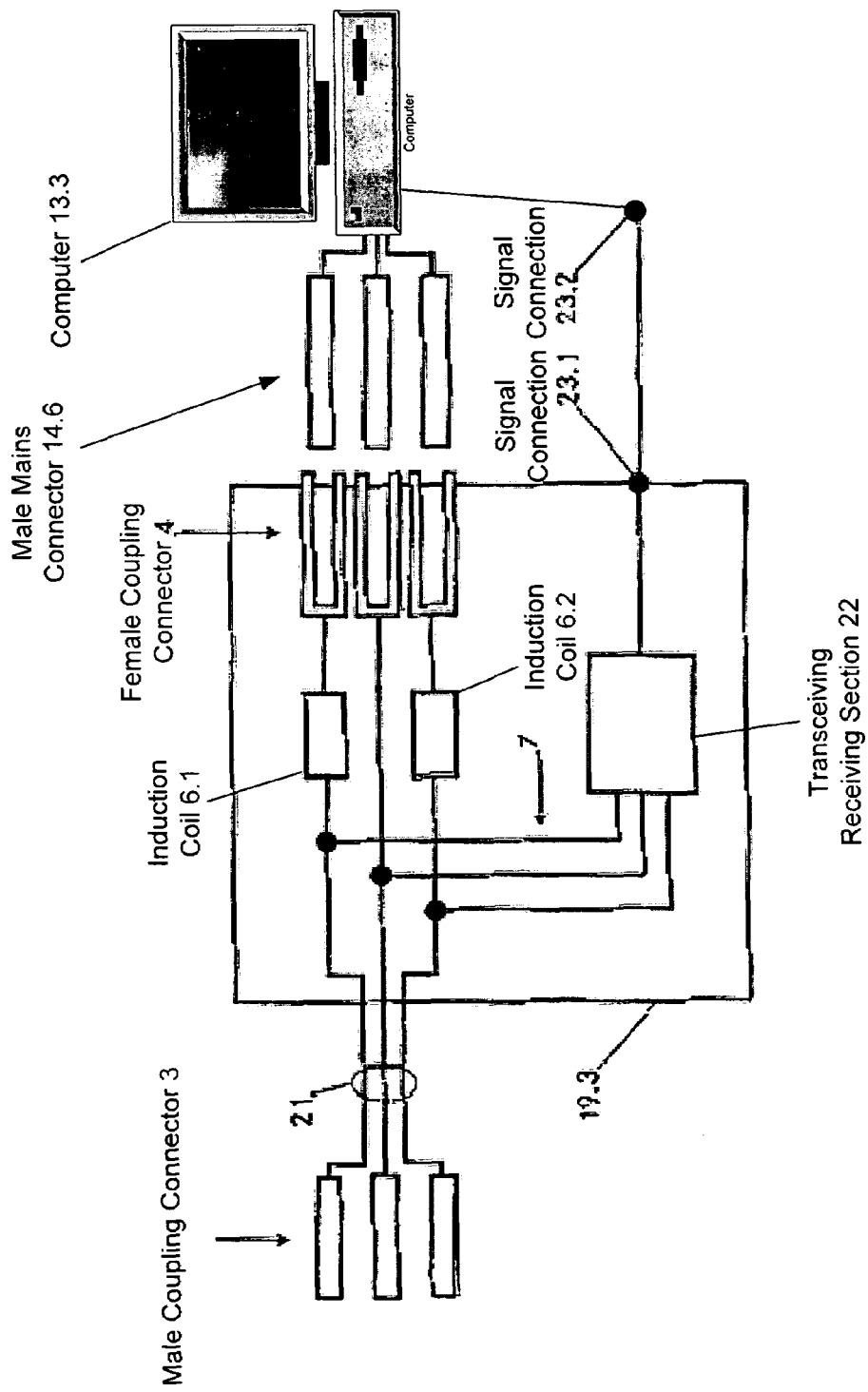
FIG. 4 shows a schematic illustration of a coupling apparatus integrated in a modem.

FIG. 4 shows, for example, a coupling apparatus which is partially integrated in a modem 19.3. The male mains coupling connector 3 is located at the end of a corresponding connecting cable 21, which is routed directly into the modem 19.3. The data/mains contacts of the data/mains connection are connected directly to the corresponding contacts of the transmitting/receiving section 22 of the modem 19.3. This furthermore has a signal connection 23.1. The female coupling connector 4 forms an additional output of this modem 19.3, in comparison to a conventional modem. Once again, any desired electrical loads equipped with an appropriate male mains connector can be connected to the female coupling connector 4. The illustration shows a computer 13.3 whose male mains connector 14.6 is located at the end of a mains cable and is inserted into the female coupling connector 4, and which has a signal connection 23.2 for transmitting messages from or to the modem 19.3, which signal connection 23.2 is connected to the signal connection 23.1 of the modem 19.3. The radio-frequency interference produced by the computer 13.3 is filtered out by means of the induction coils 6.1 and 6.2 in the coupling apparatus, which are located in the modem 19.3.

Instead of having to integrate the coupling apparatus or parts of it in a modem or, for example, a computer, the modem or any other transmitting/receiving appliance together with further data processing modules can, of course, also be integrated in the housing of the coupling apparatus.

Finally, the coupling apparatus may also be in the form of an extension cable, in which case the male mains coupling connector on the one hand and the female coupling connector, or else a number of female coupling connectors, on the other hand, are arranged in two housing parts which are connected by a cable, and in which case the data/mains connection can be provided in either of the housing parts, as desired. The induction coils are then accommodated in one of the two housing parts, or are distributed between the two, but always in such a way that the induction coils are not located between the data/mains connection or connections and the male mains coupling connector.

The integral version illustrated and described in FIG. 1 is, however, preferred owing to its particularly compact construction and—particularly if the coupling apparatus is in each case inserted directly into the female mains connector—simplicity and clarity in use.

The invention can also, of course, be used in an analogous manner in low-voltage power supply systems to a different Standard, for example with three phase conductors, or in a low-voltage power supply system without any earth conductor.

In summary, it can be stated that the invention allows messages to be transmitted via a low-voltage power supply system, with radio-frequency interference which is produced by any electrical loads being kept away from the power supply system, by using a coupling apparatus between each electrical load and the low-voltage power supply system, which coupling apparatus suppresses the said interference by means of induction coils. In addition, the invention makes it possible for one and the same female mains connector to be used firstly for receiving the data from the low-voltage power supply system and secondly, at the same time, for supplying electrical power to those appliances by means of which the transmitted messages, or the messages to be transmitted, are processed.

What is claimed is:

1. A device for facilitating the communication of high frequency data signals on a low voltage electric power supply network that includes an energized conductor carrying alternating current (AC) power at low voltage and a neutral conductor, wherein the low voltage electric power supply network distributes AC power throughout a structure to a plurality of female electric sockets in the structure and with each female electric socket including at least a first pin receptacle connected to the energized conductor and a second pin receptacle connected to the neutral conductor, the device comprising:

a first terminal having a first contact pin configured to mate with the first pin receptacle of a female electric socket;

said first contact pin connected to a first conductor;

said first terminal having a second contact pin configured to mate with the second pin receptacle of a female electric socket;

said first terminal configured to be removably attached to a female electric socket of the low voltage electric power supply network to receive AC power at the low voltage from the energized conductor of the low voltage electric power supply network;

said first conductor configured to receive the AC power at the low voltage from the first contact pin of the first terminal and to conduct data signals to and from the low voltage electric power supply network via said first terminal;

a second terminal having a first pin receptacle and a second pin receptacle and configured to be removably connected to an electric plug;

a second conductor connected to said first pin receptacle of said second terminal and configured to conduct AG power at the low voltage from a first inductive element connected to said first conductor to an electric apparatus removably connected to said second terminal;

said first inductive element connecting said first conductor to said second conductor and configured to attenuate high frequencies and to conduct the AC power at the low voltage;

a third terminal connected to a third conductor and wherein said third terminal is electrically connected to said first conductor via said third conductor and wherein said third terminal is configured to be removably attached to a second apparatus; and wherein high frequency data signals are received from a female electric socket at said first terminal and conducted through said first conductor and through said third conductor to said third terminal.

2. The device according to claim 1, wherein:
said first terminal includes a third contact pin connected to a fourth conductor;
said second terminal includes a third pin receptacle connected to a fifth conductor; and
wherein the device further comprises a second inductive element connecting said fourth conductor to said fifth conductor.

3. The device according to claim 1, wherein said third terminal includes a modem configured to receive AC power and the data signals via said third conductor and to demodulate data signals for supply to a second apparatus connected to said third terminal.

4. The device according to claim 1, wherein:
said first and second pin receptacles of said second terminal form at least part of a first female electric socket and said second terminal includes a second female electric socket having a first and second pin receptacle; and
wherein said first pin receptacle of said second female electric socket is connected to said second conductor and wherein said second female electric socket is configured to receive an electric plug.

5. A device for facilitating the communication of high frequency data signals over a low voltage electric power supply network that includes an energized conductor carrying alternating current (AC) power at low voltage and a neutral conductor, wherein the low voltage electric power supply network distributes AC power throughout a structure to a plurality of female electric sockets in the structure and with each female electric socket including at least a first pin receptacle connected to the energized conductor and a second pin receptacle connected to the neutral conductor, the device comprising:
a first terminal having a first contact pin configured to mate with the first pin receptacle of a female electric socket;
said first terminal having a second contact pin configured to mate with the second pin receptacle of a female electric socket;
said first terminal configured to be removably attached to a female electric socket of the low voltage electric power supply network;
said first terminal configured to receive AC power at the low voltage from the low voltage electric power supply network, and to conduct data signals to and from the low voltage electric power supply network;
a second terminal having a first pin receptacle and a second pin receptacle and configured to be removably connected to an electric plug;
a first inductive element electrically connecting said first contact pin of said first terminal to said first pin receptacle of said second terminal and configured to attenuate high frequencies and to conduct the AC power at the low voltage from said first terminal to said second terminal;
wherein said second terminal is configured to supply AC power at the low voltage, received via said first terminal, to an electric appliance connected to said second terminal; and
a third terminal electrically connected to said first terminal and configured to receive AC power at the low voltage and data signals from said first terminal and configured to output the AC power at the low voltage and to output the received data signals; and wherein high frequency data signals are received from a female electric socket at said first terminal and conducted from said first terminal to said third terminal.

6. The device according to claim 5, further comprising a modem communicatively coupled to said first terminal and configured to receive the data signals therefrom and to output demodulated data signals to a communication device.

7. The device according to claim 6, wherein the electric appliance and the communication device are the same device.

8. The device according to claim 5, further comprising a second inductive element connecting said second contact pin of said first terminal to said second pin receptacle of said second terminal, and configured to attenuate high frequencies and to conduct the AC power from said first terminal to said second terminal.

9. A device for facilitating the communication of high frequency data signals on a low voltage electric power supply network that includes an energized conductor carrying alternating current (AC) power at low voltage and a neutral conductor, wherein the low voltage electric power supply network distributes AC power throughout a structure to a plurality of female electric sockets in the structure and with each female electric socket including at least a first pin receptacle connected to the energized conductor and a second pin receptacle connected to the neutral conductor, the device comprising:
a first terminal having a first contact pin configured to mate with the first pin receptacle of a female electric socket;
said first terminal having a second contact pin configured to mate with the second pin receptacle of a female electric socket;
said first terminal configured to be removably attached to a female electric socket;
said first terminal configured to receive AC power at the low voltage from energized conductor of the low voltage electric power supply network, and to conduct data signals to and from the energized conductor of the low voltage electric power supply network;
a second terminal having a first pin receptacle and a second pin receptacle and configured to be removably connected to an electric plug;
a housing;
a first filter disposed in said housing;
said first filter connecting said first contact pin of said first terminal to said first pin receptacle of said second terminal and configured to attenuate high frequencies and to conduct the AC power from said first terminal to said second terminal at the low voltage;
wherein said second terminal is configured to supply AC power at the low voltage, received via said first terminal, to an electric appliance removably connected to said second terminal; and
a modem disposed in said housing and having a first modem terminal communicatively coupled to said first terminal to communicate modulated data signals through said first terminal over the low voltage power supply network and said modem having a second modem terminal configured to be electrically connected to a communication device to communicate data with the communication device.

10. The device according to claim 9, wherein the electric appliance device and the communication device are the same device.

11. The device according to claim 9, wherein said first filter comprises an inductor.

12. The device according to claim 9, further comprising:
a second filter disposed in said housing;

said second filter connecting said second contact pin of said first terminal to said second pin receptacle of said second terminal and configured to attenuate high frequencies and to conduct the AC power from said first terminal to said second terminal; and wherein said first filter and said second filter are connected to said first terminal for electrical connection to different power line conductors of the low voltage electric power supply network via said first terminal.

13. A communication network for facilitating high frequency communications by a first communications device over a low voltage electric power supply network in the presence of a potentially interfering appliance, wherein the low voltage electric power supply network includes an energized conductor carrying alternating current (AC) power at low voltage and a neutral conductor, and wherein the low voltage electric power supply network distributes AC power throughout a structure to a plurality of female electric sockets in the structure and with each female electric socket including at least a first pin receptacle connected to the energized conductor and a second pin receptacle connected to the neutral conductor, the network comprising:

a first adapter removably attached to a first of the plurality of female electric sockets and connecting the first communications device to the low voltage electric power supply network;

said first adapter having a first modem configured to communicatively couple the first communications device to the low voltage electric power supply network;

said first adapter further having an appliance terminal that includes a female electric socket and configured to conduct AC power at the low voltage received from the low voltage electric power supply network to an appliance removably attached to the female electric socket of said first adapter and to attenuate high frequencies;

a filtering adapter having an electric plug removably attached to a second of the plurality of female sockets of the low voltage electric power supply network; and said filtering adaptor having a female electric socket configured to be removably attached to the potentially interfering appliance and wherein said filtering adaptor is configured to connect the potentially interfering appliance to the low voltage electric power supply network and is configured to conduct AC power received from the low voltage electric power supply network to the potentially interfering appliance at the low voltage and to attenuate high frequencies.

14. The device according to claim 13, wherein said appliance terminal of said first adapter includes a first filter configured to be electrically connected to the energized conductor of the low voltage electric power supply network and a second filter configured to be electrically connected to the neutral conductor of the low voltage electric power supply network.

15. The device according to claim 13, further comprising:

a second adapter removably attached to a third of the plurality of female electric sockets and connecting a second communications device to the low voltage electric power supply network;

said second adapter having a second modem configured to communicatively couple the second communications device to the low voltage electric power supply network;

said second adapter further having a second appliance terminal that includes a female socket and configured to conduct AC power at the low voltage received from the low voltage electric power supply network to an appliance removably attached to the female socket of said second adapter and to attenuate high frequencies; and wherein said first adapter and said second adapter facilitate communications between the first communications device and the second communications device over the low voltage electric power supply network.

16. The device according to claim 13, wherein said first adapter is at a location remote from said filtering adapter.

17. The device according to claim 13, wherein said appliance terminal provides AC power to the first communications device at the low voltage.

18. A communication network for facilitating high frequency communications between a first communications device and a second communications device over a low voltage electric power supply network, the low voltage electric power supply network including an energized conductor carrying alternating current (AC) power at low voltage and a neutral conductor, wherein the low voltage electric power supply network distributes AC power throughout a structure to a plurality of female electric sockets in the structure and with each female electric socket including at least a first pin receptacle connected to the energized conductor and a second pin receptacle connected to the neutral conductor, comprising:

a first adapter removably attached to a first of the plurality of female electric sockets and removably attached to the first communications device;

said first adapter connecting the first communications device to the low voltage electric power supply network;

said first adapter having a first modem configured to communicatively couple the first communications device to the low voltage electric power supply network;

said first adapter further having a first appliance terminal that includes a female socket configured to be removably attached to an appliance;

said first adaptor configured to conduct AC power received from the low voltage electric power supply network to an appliance removably attached to the female socket of said first appliance terminal at the low voltage;

said first adaptor configured to attenuate high frequencies conducted into the first appliance terminal by an appliance removably attached to the female socket of said first appliance terminal;

a second adapter having an electric plug removably attached to a second of the plurality of female sockets of the low voltage electric power supply network;

said second adapter having a second modem configured to communicatively couple the second communications device to the low voltage electric power supply network;

said second adapter further having a second appliance terminal having a female electric socket configured to be removably attached to an electric plug of an appliance;

said second adapter configured to conduct AC power received from the low voltage electric power supply network to an appliance removably attached to the female socket of the second appliance terminal at the low voltage;

said second adaptor configured to attenuate high frequencies conducted into the second appliance terminal by an appliance removably attached to the female socket of said second appliance terminal; and wherein said first adapter and said second adapter facilitate communications between the first communications device and the second communications device over the low voltage power supply network.

\* \* \* \* \*

UNITED STATES PATENT AND TRADEMARK OFFICE
CERTIFICATE OF CORRECTION

PATENT NO.         : 7,675,190 B1
APPLICATION NO.    : 10/149003
DATED              : March 9, 2010
INVENTOR(S)        : Kurt Muller et al.

It is certified that error appears in the above-identified patent and that said Letters Patent is hereby corrected as shown below:

On the title page, item (54), Title, column 1, line 1-3, delete "ASSEMBLY FOR TRANSMITTING INFORMATION VIA A LOW-VOLTAGE POWER SUPPLY NETWORK" and insert -- ARRANGEMENT FOR TRANSMITTING MESSAGE VIA A LOW-POWER SUPPLY SYSTEM --, therefor.

In column 1, line 1-3, Title, delete "ASSEMBLY FOR TRANSMITTING INFORMATION VIA A LOW-VOLTAGE POWER SUPPLY NETWORK" and insert -- ARRANGEMENT FOR TRANSMITTING MESSAGE VIA A LOW-POWER SUPPLY SYSTEM --, therefor.

In column 1, line 1-3, below "Title", insert -- Related U.S. Application Data --.

In column 1, line 5, delete "§371" and insert -- § 371 --, therefor.

In column 8, line 40, delete "1.1." and insert -- 1.1 --, therefor.

In column 10, line 58, in Claim 1, delete "AG" and insert -- AC --, therefor.

Signed and Sealed this

First Day of June, 2010

David J. Kappos
*Director of the United States Patent and Trademark Office*